(12) United States Patent
Smith et al.

(10) Patent No.: US 11,671,040 B2
(45) Date of Patent: Jun. 6, 2023

(54) TURBOMACHINE WITH AN ELECTRIC MACHINE ASSEMBLY AND METHOD FOR OPERATION

(71) Applicant: General Electric Company, Schenectady, NY (US)

(72) Inventors: Justin Paul Smith, Montgomery, OH (US); Kurt David Murrow, Liberty Township, OH (US); Darek Tomasz Zatorski, Fort Wright, KY (US); Patrick Michael Marrinan, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/242,386

(22) Filed: Apr. 28, 2021

(65) Prior Publication Data

US 2021/0249978 A1 Aug. 12, 2021

Related U.S. Application Data

(63) Continuation of application No. 16/838,165, filed on Apr. 2, 2020, now Pat. No. 10,998,837, which is a
(Continued)

(51) Int. Cl.
*H02P 9/04* (2006.01)
*F02C 7/36* (2006.01)
(Continued)

(52) U.S. Cl.
CPC ................ *H02P 9/04* (2013.01); *F01D 15/10* (2013.01); *F01D 19/00* (2013.01); *F02C 7/36* (2013.01);
(Continued)

(58) Field of Classification Search
CPC . H02P 9/04; H02P 9/008; F01D 15/10; F01D 19/00; F02C 7/36; F02C 9/32;
(Continued)

(56) References Cited

U.S. PATENT DOCUMENTS

| 608 | A | 2/1838 | Moon |
|---|---|---|---|
| 1,208 | A | 6/1839 | Burt et al. |

(Continued)

FOREIGN PATENT DOCUMENTS

EP 2733312 A2 10/2013

*Primary Examiner* — Joseph Ortega
(74) *Attorney, Agent, or Firm* — Dority & Manning, P.A.

(57) ABSTRACT

A turbomachine and method for operating a turbomachine comprising a first rotatable component and a second rotatable component each defining a rotatable speed mechanically independent of one another, and an electric machine electrically coupled to the first rotatable component and the second rotatable component such that a load level relative to the first rotatable component and the second rotatable component is adjustable is generally provided. The method includes adjusting a first load at a first rotor assembly of the electric machine electrically coupled to the first rotatable component such that a first speed of the first rotatable component is increased or decreased based on an engine condition and the first load; adjusting a second load at a second rotor assembly of the electric machine electrically coupled to the second rotatable component such that a second speed of the second rotatable component is decreased or increased based on the engine condition and the second load; and transferring electrical energy generated from at least one of the first rotatable component or the second rotatable component.

21 Claims, 4 Drawing Sheets

Related U.S. Application Data continuation of application No. 15/823,952, filed on Nov. 28, 2017, now Pat. No. 10,644,630.

(51) Int. Cl.
  *F02C 9/32* (2006.01)
  *H02P 9/00* (2006.01)
  *F01D 15/10* (2006.01)
  *F01D 19/00* (2006.01)

(52) U.S. Cl.
  CPC .............. *F02C 9/32* (2013.01); *H02P 9/008* (2013.01); *F05D 2220/32* (2013.01); *F05D 2220/76* (2013.01); *F05D 2270/023* (2013.01); *F05D 2270/101* (2013.01); *F05D 2270/20* (2013.01); *F05D 2270/303* (2013.01); *F05D 2270/304* (2013.01); *F05D 2270/3013* (2013.01); *F05D 2270/62* (2013.01)

(58) Field of Classification Search
  CPC .............. F05D 2220/32; F05D 2220/76; F05D 2270/023; F05D 2270/101; F05D 2270/20; F05D 2270/3013; F05D 2270/303; F05D 2270/304; F05D 2270/62
  See application file for complete search history.

(56) References Cited

U.S. PATENT DOCUMENTS

| | | | |
|---|---|---|---|
| 2,626,501 | A | 1/1953 | Pavlecka et al. |
| 3,997,131 | A | 12/1976 | Kling |
| 4,246,531 | A | 1/1981 | Jordan |
| 4,896,499 | A | 1/1990 | Rice |
| 5,432,383 | A | 7/1995 | Kawamura |
| 5,694,765 | A | 12/1997 | Hield et al. |
| 6,385,959 | B1 | 5/2002 | Montoya |
| 6,467,725 | B1 | 10/2002 | Coles et al. |
| 6,936,947 | B1 | 8/2005 | Leijon et al. |
| 7,063,505 | B2 | 6/2006 | Czachor |
| 7,296,409 | B2 | 11/2007 | Spooner |
| 7,513,120 | B2 | 4/2009 | Kupratis |
| 8,191,352 | B2 | 6/2012 | Schilling |
| 8,313,279 | B2 | 11/2012 | Mollmann |
| 8,365,510 | B2 | 2/2013 | Lugg |
| 8,636,241 | B2 | 1/2014 | Lugg et al. |
| 8,678,754 | B2 | 3/2014 | Morgan et al. |
| 9,045,996 | B2 | 6/2015 | Anghel et al. |
| 9,109,517 | B2 | 8/2015 | Banaerjee et al. |
| 9,176,024 | B2 | 11/2015 | Jensen et al. |
| 9,416,820 | B2 | 8/2016 | Ertas et al. |
| 9,664,070 | B1 | 5/2017 | Clauson et al. |
| 2001/0024075 | A1 | 9/2001 | Caamano |
| 2002/0122723 | A1 | 9/2002 | Care et al. |
| 2002/0142208 | A1 | 10/2002 | Keefer et al. |
| 2003/0143448 | A1 | 7/2003 | Keefer |
| 2005/0189772 | A1 | 9/2005 | Gozdawa |
| 2006/0087123 | A1 | 4/2006 | Stout et al. |
| 2008/0174194 | A1 | 7/2008 | Qu et al. |
| 2010/0107652 | A1 | 5/2010 | Hyde et al. |
| 2010/0127496 | A1 | 5/2010 | Burkholder et al. |
| 2010/0133835 | A1 | 6/2010 | Dooley et al. |
| 2010/0251726 | A1 | 10/2010 | Jones et al. |
| 2010/0327589 | A1 | 12/2010 | Macchia |
| 2012/0201657 | A1 | 8/2012 | Donnelly et al. |
| 2013/0081406 | A1 | 4/2013 | Malmborg et al. |
| 2013/0250794 | A1 | 9/2013 | Kusano et al. |
| 2013/0277976 | A1 | 10/2013 | Koenig |
| 2013/0292941 | A1 | 11/2013 | Mountain et al. |
| 2013/0340521 | A1 | 12/2013 | Clark et al. |
| 2014/0117894 | A1 | 5/2014 | Huang et al. |
| 2014/0150401 | A1 | 6/2014 | Venter |
| 2014/0352320 | A1 | 12/2014 | Nanataki et al. |
| 2015/0035286 | A1 | 2/2015 | Stephens |
| 2015/0098792 | A1 | 4/2015 | Doebbeling et al. |
| 2015/0244296 | A1 | 8/2015 | Edwards |
| 2015/0345426 | A1 | 12/2015 | Houston et al. |
| 2015/0377052 | A1 | 12/2015 | Hill et al. |
| 2016/0023773 | A1 | 1/2016 | Himmelmann et al. |
| 2016/0047303 | A1 | 2/2016 | Davidson et al. |
| 2016/0047307 | A1 | 2/2016 | Williamson et al. |
| 2016/0047309 | A1 | 2/2016 | Davidson et al. |
| 2016/0102679 | A1 | 4/2016 | Iwrey |
| 2016/0105078 | A1 | 4/2016 | Santini et al. |
| 2016/0109133 | A1 | 4/2016 | Edwards et al. |
| 2016/0130970 | A1 | 5/2016 | Blazer et al. |
| 2016/0160867 | A1 | 6/2016 | Gehlot |
| 2016/0164372 | A1 | 6/2016 | Zehnle |
| 2016/0177769 | A1 | 6/2016 | Iwrey |
| 2016/0177770 | A1 | 6/2016 | Adams et al. |
| 2016/0252015 | A1 | 9/2016 | Kusumi et al. |
| 2016/0359324 | A1 | 12/2016 | Knowles et al. |
| 2016/0376981 | A1 | 12/2016 | Ullyott et al. |
| 2017/0029131 | A1 | 2/2017 | Steinwandel et al. |
| 2017/0044989 | A1 | 2/2017 | Gemin et al. |
| 2017/0114665 | A1 | 4/2017 | Gemin et al. |
| 2017/0141648 | A1 | 5/2017 | Chong et al. |
| 2017/0159577 | A1 | 6/2017 | Hino et al. |
| 2017/0159665 | A1 | 6/2017 | Bergamini et al. |
| 2017/0234237 | A1 | 8/2017 | Pech et al. |
| 2017/0274992 | A1 | 9/2017 | Chretien |
| 2017/0276024 | A1 | 9/2017 | Diwinsky et al. |
| 2017/0285677 | A1 | 10/2017 | Converse et al. |
| 2017/0292400 | A1 | 10/2017 | Bifulco |
| 2017/0298330 | A1 | 10/2017 | Sato et al. |
| 2017/0298816 | A1 | 10/2017 | Razak et al. |
| 2017/0306980 | A1 | 10/2017 | Tsuji et al. |
| 2017/0335774 | A1 | 11/2017 | Moniz et al. |
| 2018/0065743 | A1 | 3/2018 | Vondrell et al. |
| 2018/0131250 | A1 | 5/2018 | Jewell et al. |
| 2018/0142662 | A1 | 5/2018 | Dal et al. |
| 2018/0187595 | A1 | 7/2018 | Apte et al. |
| 2018/0187627 | A1 | 7/2018 | Apte et al. |
| 2018/0230912 | A1 | 8/2018 | Hasel et al. |
| 2018/0231023 | A1 | 8/2018 | Gentry et al. |
| 2018/0252158 | A1 | 9/2018 | Malkamaki et al. |
| 2018/0278102 | A1 | 9/2018 | Shirokov |
| 2018/0342917 | A1 | 11/2018 | Hunter et al. |
| 2019/0010869 | A1 | 1/2019 | Kerth |
| 2019/0013722 | A1 | 1/2019 | Yu |
| 2019/0052206 | A1 | 2/2019 | Noderer |
| 2019/0052208 | A1 | 2/2019 | Noderer |
| 2019/0063261 | A1 | 2/2019 | Varney et al. |
| 2019/0078688 | A1 | 3/2019 | Walker et al. |
| 2019/0131902 | A1 | 5/2019 | Ciciriello et al. |
| 2019/0136768 | A1* | 5/2019 | Harvey .................. F02C 3/113 |
| 2019/0145322 | A1 | 5/2019 | Sellick et al. |
| 2019/0195081 | A1 | 6/2019 | Kim |
| 2019/0211749 | A1 | 7/2019 | Rodrigues |
| 2019/0271267 | A1 | 9/2019 | Husband et al. |
| 2019/0368424 | A1 | 12/2019 | Kupratis et al. |
| 2019/0382121 | A1 | 12/2019 | Schwarz et al. |
| 2019/0383157 | A1 | 12/2019 | Kupratis et al. |
| 2020/0023982 | A1 | 1/2020 | Kupratis et al. |
| 2020/0052552 | A1 | 2/2020 | Husband et al. |
| 2020/0080495 | A1 | 3/2020 | Leque et al. |
| 2020/0088105 | A1 | 3/2020 | Venter et al. |
| 2020/0102892 | A1 | 4/2020 | Polly et al. |
| 2020/0109685 | A1 | 4/2020 | Kupratis et al. |
| 2020/0182158 | A1 | 6/2020 | Kupratis |

* cited by examiner

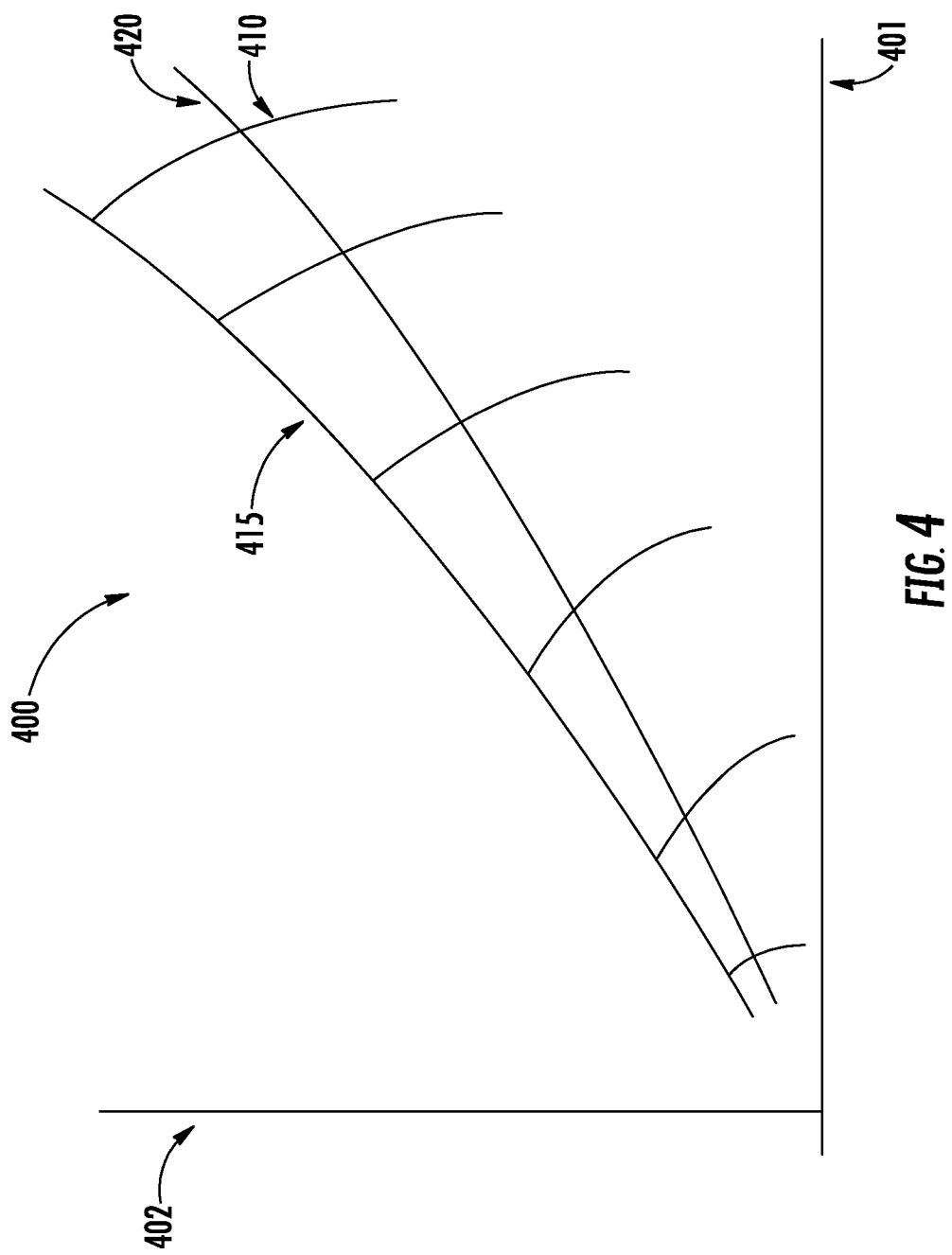

TURBOMACHINE WITH AN ELECTRIC MACHINE ASSEMBLY AND METHOD FOR OPERATION

CROSS-REFERENCE TO RELATED APPLICATIONS

The present application claims the benefit of the earliest available effective filing date and is a continuation application of U.S. patent application Ser. No. 16/838,165, which is a continuation application of U.S. patent application Ser. No. 15/823,952, each titled "TURBOMACHINE WITH AN ELECTRIC MACHINE ASSEMBLY AND METHOD FOR OPERATION", having a filing date of Nov. 28, 2017 and issued as U.S. patent Ser. No. 10/644,630, and which is incorporated herein by reference in its entirety.

FIELD

The present subject matter relates generally to a turbomachine, and more particularly, to a turbomachine having an electric machine assembly integrated at least partially therein, and methods for operation of the turbomachine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain gas turbine engines further include electric machines that extract energy from one of the rotors of the engine. Typically, electrical energy generated from the electric machine and the rotor is utilized for operation of aircraft and engine subsystems. Some electric machines may further route energy to a rotor of the engine, such as to define a hybrid electric gas turbine engine.

However, as electric machines increase in power generation and transmission capability, there is a need for methods for operating an engine including an electric machine such as to improve overall engine performance and operability.

BRIEF DESCRIPTION

Aspects and advantages of the invention will be set forth in part in the following description, or may be obvious from the description, or may be learned through practice of the invention.

A turbomachine and method for operating a turbomachine comprising a first rotatable component and a second rotatable component each defining a rotatable speed mechanically independent of one another, and an electric machine electrically coupled to the first rotatable component and the second rotatable component such that a load level relative to the first rotatable component and the second rotatable component is adjustable is generally provided. The method includes adjusting a first load at a first rotor assembly of the electric machine electrically coupled to the first rotatable component such that a first speed of the first rotatable component is increased or decreased based on an engine condition and the first load; adjusting a second load at a second rotor assembly of the electric machine electrically coupled to the second rotatable component such that a second speed of the second rotatable component is decreased or increased based on the engine condition and the second load; and transferring electrical energy generated from at least one of the first rotatable component or the second rotatable component.

In one embodiment of the method, adjusting the first load level at the first rotor assembly is in inverse relationship relative to adjusting the second load level at the second rotor assembly.

In another embodiment of the method, transferring electrical energy generated from at least one of the first rotatable component or the second rotatable component includes transmitting electrical energy to one or more apparatuses electrically coupled to the turbomachine.

In various embodiments, the method further includes rotating the second rotatable component at the second speed defining a minimum steady state second speed; increasing the first load level at the first rotor assembly; and decreasing the first speed of the first rotatable component via the increased first load level. In one embodiment, rotating the second rotatable component at the second speed is based on at least one of a fuel-air ratio, a compressor exit pressure, an inter-turbine temperature, a turbine exit temperature, or an exhaust gas temperature.

In still various embodiments, the method further includes generating electrical energy via the first rotor assembly and the first rotatable component; transmitting electrical energy from the first rotor assembly to the second rotor assembly; and rotating the second rotatable component at the second speed based at least in part on the electrical energy from the second rotor assembly. In still another embodiment, the method further includes decreasing a fuel flow at a combustion chamber such that rotating the second rotatable component at the second speed based at least in part on the electrical energy from the second rotor assembly results in approximately no change in the second speed.

In yet another embodiment, the method further includes rotating the second rotatable component at the second speed; generating electrical energy via the second rotor assembly and the second rotatable component; transmitting electrical energy from the second rotor assembly to the first rotor assembly; and rotating the first rotatable component at the first speed based at least in part on the electrical energy from the first rotor assembly. In one embodiment, the method further includes increasing the second load level at the second rotor assembly; and decreasing the second speed of the second rotatable component via the increased second load level. In another embodiment, transferring energy electrical energy includes transmitting electrical energy to one or more apparatuses electrically coupled to the turbomachine. In still another embodiment, decreasing the second speed of the second rotatable component is further based on one or more of a stall margin, a surge margin, an operating pressure ratio, a rotational speed.

Another aspect of the present disclosure is directed to a turbomachine defining a radial direction and an axial direction. The turbomachine includes a first rotatable component rotatable to a first speed; a second rotatable component rotatable to a second speed mechanically independent of the first speed; and an electric machine assembly. The electric machine assembly includes a first rotor assembly disposed at the first rotatable component; a second rotor assembly disposed at the second rotatable component; and a stator assembly disposed between the first rotatable component and the second rotatable component. The turbomachine further includes a controller comprising one or more processors and one or more memory devices. The one or more memory devices stores instructions that when executed by the one or more processors cause the one or more processors to perform operations. The operations include one or more embodiments of the method for operating a turbomachine including the first rotatable component, the second rotatable component, and the electric machine assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 is an exemplary compressor map.

Figure 1:
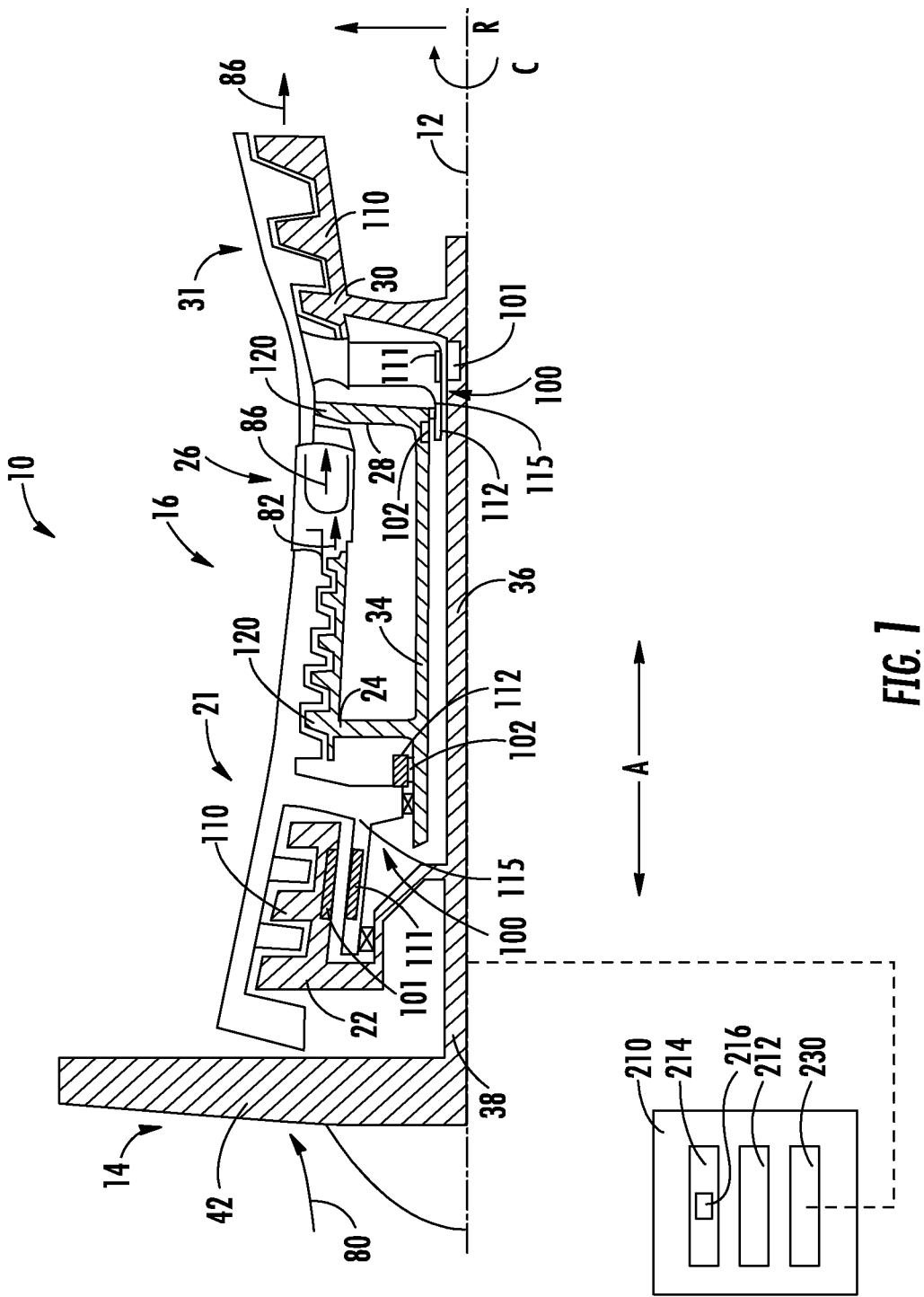
FIG. 1 is a schematic cross sectional view of an exemplary turbomachine incorporating an exemplary embodiment of an electric machine according to an aspect of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The terms "low speed" and "high-speed" refer to relative speeds, such as relative rotational speeds, of two components during operations of the turbomachine, and do not imply or require any minimum or maximum absolute speeds.

The terms "altitude" or "at altitude" generally refer to one or more atmospheric conditions at which a turbomachine may experience as a system of an apparatus in flight, including an air speed or flow rate, angle of attack, pressure, density, and temperature. For example, "at altitude" and variations thereof may refer to one or more flight conditions in which the engine, or the apparatus attached thereto, is off of the ground, such as following take off roll of an aircraft and prior to landing.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Methods and structures for operating a turbomachine including an electric machine are generally provided. The methods for operating a turbomachine including an electric machine generally provided herein may improve overall engine performance and operability by embedding generators at multiple spools of the engine, such as the low pressure spool and the high pressure spool, and transmitting energy to and from each spool based on engine operation. At off-design conditions (e.g., startup, ignition, sub-idle, idle, mid-power, altitude re-light, etc.), energy may be traded and transmitted between the engine spools to reduce fuel burn, improve engine efficiency, improve engine performance, and maintain or improve engine operability margins.

Referring to FIG. 1, an axial cross-sectional view of an exemplary embodiment of a turbomachine (hereinafter, "engine 10") is generally provided. The engine 10 may generally define a gas turbine engine. In various embodiments, the engine 10 may define turbomachinery in general, such as turbofan, turboprop, turbojet, or turboshaft configurations, including, but not limited to, marine and industrial gas turbine engines and auxiliary power units.

The engine 10 defines an axial direction A extended co-directional to a reference axial centerline 12 provided for reference. The engine 10 further defines a radial direction R extended from the axial centerline 12 and a circumferential direction C extended relative to the axial centerline 12. In general, the engine 10 may include a gas generator or core engine 16 disposed downstream of a fan assembly 14.

The core engine 16 may generally include a substantially tubular outer casing that defines an annular inlet 20. The outer casing encases or at least partially forms, in serial flow relationship, a compressor section 21 having a booster or low pressure (LP) compressor 22, a high pressure (HP) compressor 24, a combustion section 26, and a turbine section 31 including a high pressure (HP) turbine 28, a low pressure (LP) turbine 30 and the fan assembly 14. A high pressure (HP) rotor shaft 34 drivingly connects the HP turbine 28 to the HP compressor 24. A low pressure (LP) rotor shaft 36 drivingly connects the LP turbine 30 to the LP compressor 22.

Although generally depicted as a two-spool turbofan engine, the engine 10 may further define one or more additional spools configured between the LP and HP spools, such as an intermediate pressure (IP) spool including an IP compressor coupled to an IP turbine via an IP shaft.

As shown in FIG. 1, the fan assembly 14 includes a plurality of fan blades 42 that are coupled to and that extend radially outwardly from the fan shaft 38. In the embodiment generally provided in FIG. 1, the fan assembly 14, the LP compressor 22, and the LP turbine 30 may together define a low pressure or LP spool of the engine 10. More specifically, the rotary components of the fan assembly 14, the LP compressor 22, and the LP turbine 30 may together define the LP spool. The LP spool rotates together about the axial centerline 12 at substantially the same rotational speed, such as defining a first speed. However, in other embodiments not shown, the engine 10 includes a speed reduction device that reduces the rotational speed of the fan assembly 14 relative to one or more of the LP compressor 22 or the LP turbine 30. In various embodiments, the speed reduction device defines a gear assembly, such as a reduction gearbox or power gearbox, or another speed reduction assembly, including, but not limited to, hydraulic, pneumatic, or other transmission systems. In still various embodiments, the speed reduction device may define a proportional rotational speed of at least the fan assembly 14 relative to one or more of the LP compressor 22 or the LP turbine 30. For purposes of discussion herein, the first speed of the LP spool may include another rotational speed of the fan assembly 14 dependent on the rotational speed of one or more of the LP compressor 22 and the LP turbine 30.

Referring still to FIG. 1, the HP compressor 24 and the HP turbine 28 may together define a high pressure or HP spool of the engine 10. The HP spool rotates together about the axial centerline 12 at substantially the same rotational speed, such as defining a second speed. During operation of the engine 10, the HP spool is driven into rotation to intake and flow a volume of air or other oxidizer, shown schematically by arrows 80, into the core engine 16. The volume of air 80 is compressed as it flows across the LP compressor 22 and the HP compressor 24. The compressed volume of air, shown schematically by arrows 82, exits the HP compressor 24 and enters the combustion section 26. The compressed air 82 is mixed with a liquid or gaseous fuel (or combinations thereof) and ignited to produce combustion gases 86. The combustion gases 86 flow across and expand at the HP turbine 28 and the LP turbine 30. The expansion of the combustion gases 86 at each turbine 28, 30 releases energy that generates rotation of the respective HP spool and LP spool of the engine 10.

It should be appreciated that the LP spool and the HP spool are mechanically de-coupled from one another such that rotation of one spool does not necessarily result in rotation of the other. However, the LP spool and the HP spool are aerodynamically coupled such that changes in rotational speed of one may result in changes in rotational speed to the other. As will be further discussed herein, the present disclosure provides methods for operating a turbomachine, such as the engine 10, that enables changes in rotation speed of one spool while maintaining (e.g., not changing) a rotational speed in the other spool.

Referring still to FIG. 1, the engine 10 includes an electric machine 100 disposed between a first rotatable component and a second rotatable component. In various embodiments, such as generally shown in FIG. 1, the first rotatable component may be defined by the LP spool. More specifically, the first rotatable component may be defined by the rotary members of the LP compressor 22, the fan rotor 38, and fan blades 42 of the fan assembly 14. However, in other embodiments, the first rotatable component may be defined by the LP turbine 30.

In still various embodiments, the second rotatable component may be defined by the HP spool. More specifically, the second rotatable component may be defined by rotary members of the HP compressor 24. In other embodiments, the second rotatable component may be defined by the HP turbine 28.

Figure 2:
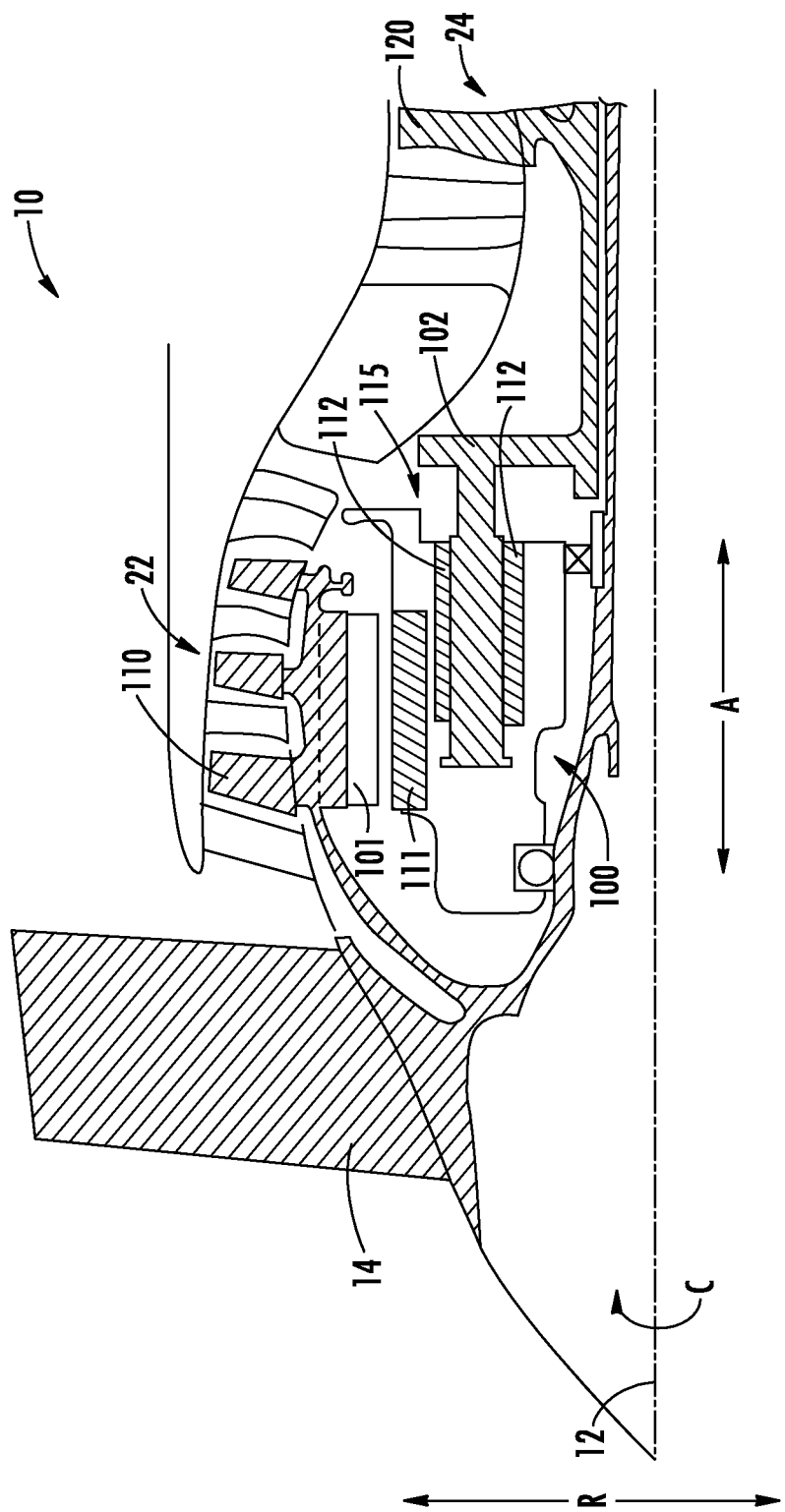
FIG. 2 is a schematic cross sectional view of an exemplary embodiment of an electric machine of the turbomachine according to an aspect of the present disclosure.

Referring now to FIG. 2, a portion of the engine 10 is generally provided to show an embodiment of the electric machine 100 relative to a first rotatable component 110 and a second rotatable component 120. The electric machine assembly 100 includes a first rotor assembly 101 disposed at the first rotatable component 110 and a second rotor assembly 102 disposed at the second rotatable component 120. The electric machine 100 may generally define a generator or motor including a rotor assembly and a stator assembly. The first rotor assembly 101 is coupled to the first rotatable component 110, such as the LP spool, such that the first rotor assembly 101 may define a first rotor of the electric machine 100. The second rotor assembly 102 is coupled to the second rotatable component 120, such as the HP spool, such that the second rotor assembly 102 may define a second rotor of the electric machine 100.

The electric machine 100 further includes a stator assembly 115 is disposed between the first rotatable component 110 and the second rotatable component 120. The first rotor assembly 101 coupled to the first rotatable component 110 is configured to rotate at a first speed around the fixed stator assembly 115. The second rotor assembly 102 coupled to the second rotatable component 120 is configured to rotate at a second speed around the fixed stator assembly 115. The second speed is generally different from the first speed, such as described in regard to the LP spool and the HP spool.

The stator assembly 115 may further include a first stator assembly 111 in electrical communication with the first rotor assembly 101. The stator assembly 115 may still further includes a second stator assembly 112 in electrical communication with the second rotor assembly 102. The stator assembly 115 is configured to provide electrical communication between the first stator assembly 111 and the second stator assembly 112 such that a change (e.g., increase or decrease) in a first electrical load, resistance, or impedance of one stator/rotor combination (e.g., the first stator assembly 111 and the first rotor assembly 101) may change (e.g., decrease or increase) a second electrical load, resistance, or impedance of another stator/rotor combination (e.g., the second stator assembly 112 and the second rotor assembly 102).

Figure 3:
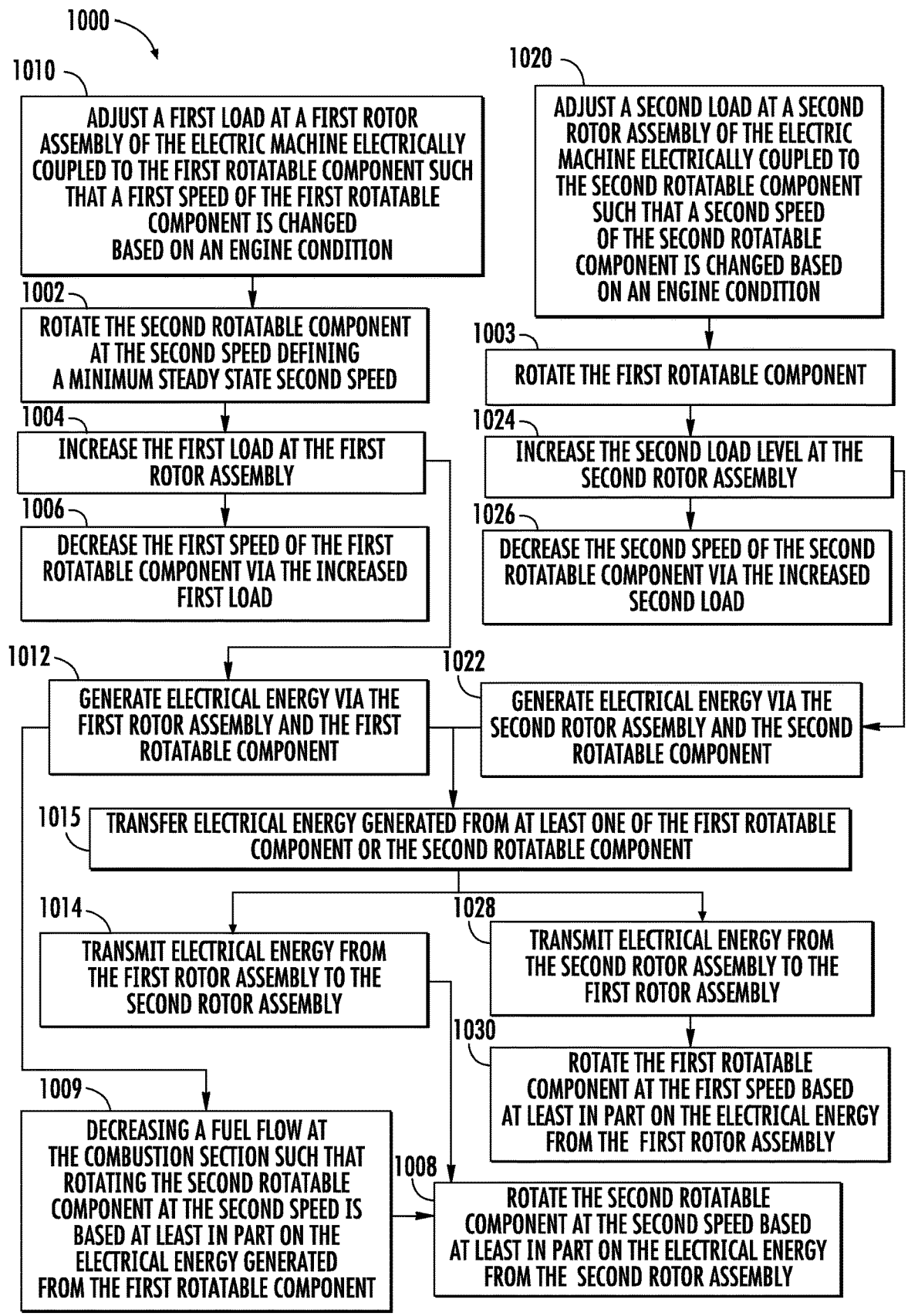
FIG. 3 is a flowchart outlining exemplary steps of a method for operating a turbomachine including an electric machine.

Referring now to FIG. 3, a flowchart outlining exemplary steps of a method for operating a turbomachine (hereinafter, "method 1000") is generally provided. The method 1000 may be performed utilizing a turbomachine such as the engine 10 generally provided in FIGS. 1-2. However, it should be appreciated the method 1000 may be utilized for turbomachines generally including a first rotatable component and a second rotatable component each defining a rotatable speed mechanically independent of one another, and an electric machine electrically coupled to each configured to transmit electrical energy generated from one rotatable component to provide rotation to another rotatable component.

The method 1000 includes at 1010 adjusting a first load at a first rotor assembly of the electric machine electrically coupled to the first rotatable component such that a first speed of the first rotatable component is changed based on an engine condition; at 1020 adjusting a second load at a second rotor assembly of the electric machine electrically coupled to the second rotatable component such that a second speed of the second rotatable component is changed based on the engine condition; and at 1015 transferring electrical energy generated from at least one of the first rotatable component or the second rotatable component.

For example, in various embodiments of the method 1000 and the engine 10, the electric machine 100 may be configured to enable an inverse relationship between a first load at the first rotor assembly 101 relative to a second load at the second rotor assembly 102. In one embodiment, the method 1000 may include at 1012 generating electrical energy via the first rotor assembly and the first rotatable component. For example, during operation of the engine 10, electrical energy is generated via a first load at the first rotor assembly 101 coupled to the LP spool as the first rotatable component 110. The first load may be increased to result in a resistance that decreases a first speed of the LP spool.

In various embodiments, the transferring electrical energy generated from the first rotatable component, the second rotatable component, or both, at step 1015 includes transmitting electrical energy to one or more apparatuses electrically coupled to the turbomachine. In one embodiment, the apparatus may include an aircraft, land- or sea-based vessel, etc., or various subsystems, such as, but not limited to, a thermal management system, an environmental control system, engine or aircraft lighting or electrical systems, electric fan propulsion systems, or other systems that generally require electric energy. As another non-limiting example, an operator of the apparatus may selectively adjust the first load, the second load, or both, based on the engine condition. In various embodiments, the operator may include a controller (e.g., controller 210) or a manual adjustment (e.g., human operator, mechanical trigger or switch, etc.).

The method 1000 may further include at 1014 transmitting electrical energy from the first rotor assembly to the second rotor assembly. For example, electrical energy generated from the first stator 111 and first rotor 101 may be transmitted to the second stator 112 and the second rotor 102 to promote or aide rotation of the HP spool as the second rotatable component 120. As such, the second rotatable component 120 may operate on a hybrid power source of electrical energy generated from combustion gases 86 and the first electrical load generated from the first rotatable component 110, the first stator assembly 111, and the first rotor assembly 101.

In one embodiment, the method 1000 may further include at 1002 rotating the second rotatable component at the second speed defining a minimum steady state second speed; at 1004 increasing the first load at the first rotor assembly; and at 1006 decreasing the first speed of the first rotatable component via the increased first load. In still various embodiments, the method 1000 may include at 1003 rotating the first rotatable component at a first speed based at least on the second speed of the second rotatable component. For example, the method 1000 at 1003 may include generating combustion gases, such as described in regard to FIGS. 1-2, to generate thrust to operate the first rotatable component.

In various embodiments, electrical energy may be generated from the first stator 111 and first rotor 101 and transmitted to promote rotation of the second rotatable component 120 when the engine 10 is at a low power condition. For example, the engine 10 coupled to an aircraft may operate at a minimum steady state second speed of the second rotatable component 120 (i.e., minimum steady state speed following startup or ignition of the engine 10) such that the engine 10 produces power and a supply of air for thermal management systems, environmental control systems, engine and aircraft electrical systems, etc. Increasing the first load at the first rotor assembly 101 and the first stator assembly 111 then decreases the rotational first speed of the first rotatable component 110 (e.g., LP spool) which may reduce the output thrust of the engine 10 while providing sufficient air and energy for aircraft and engine systems. The reduced output thrust may reduce wear and degradation of aircraft braking systems. In various embodiments, the first load at the first rotor assembly 101 and the first stator assembly 111 may decrease the rotational first speed of the first rotatable component 110 by up to approximately 50% relative to a minimum steady state first speed defined with approximately no load applied to the first rotatable component 110.

In one embodiment, rotating the second rotatable component at the second speed is based on at least one of a fuel-air ratio, a compressor exit pressure, an inter-turbine temperature, a turbine exit temperature, or an exhaust gas temperature. The fuel-air ratio, the compressor exit pressure, the inter-turbine temperature, the turbine exit temperature, and the exhaust gas temperature may each be measured as generally understood in the art.

In one embodiment of the method 1000 at 1006, decreasing the first speed of the first rotatable component via the increased first load may be performed during startup of the engine 10. For example, as the rotational first speed of the first rotatable component 110 increases from rest or wind milling speed, the method 1000 may be utilized to generate a minimum output thrust from the first rotatable component due to combustion gases providing rotation of the first rotatable component, such as shown and described in regard to FIGS. 1-2. The first load applied to the first rotatable component 110 may reduce the first speed by up to approximately 50% relative to a minimum steady state first speed defined with approximately no load applied by the first rotor assembly 101 and the first stator assembly 111 to the first rotatable component 110.

In various embodiments, "from rest" may be defined as approximately zero revolutions per minute (RPM). In other embodiments, "wind milling speed" may generally define a rotational speed substantially due to an air speed or force of air acting upon the rotational component (e.g., the fan blades 42 of the fan assembly 14) in contrast to energy derived from combustion gases or electrical energy.

In still various embodiments, the low power condition of the engine 10 may further include one or more engine conditions at which the engine 10, coupled to an aircraft for propulsive thrust, may operate during idle or aircraft taxiing (e.g., movement of the aircraft to and from a runway before takeoff or following landing). The embodiments of the method 1000 generally provided may reduce an output thrust of the engine 10, reduce fuel consumption, and reduce wear and deterioration of systems such as, but not limited to, aircraft brakes.

In still other embodiments, the embodiments of the method 1000 may be utilized to control a rotational speed of the first rotatable component 110 or the second rotatable component 120 during startup (e.g., initial rotation to provide air for ignition), ignition, or one or more low power conditions (e.g., sub-idle, idle, etc.). For example, the method 1000 may be utilized to increase or decrease a load at the first rotational component 110 and the second rotational component 120 to normalize or more evenly distribute thermal energy at each rotational component 110, 120 to mitigate a bowed rotor start.

The method 1000 may further include at 1008 rotating the second rotatable component at the second speed based at least in part on the electrical energy from the second rotor assembly. For example, promoting rotation of the second rotatable component 120 (e.g., the HP spool) at a low power condition (e.g., a minimum steady state second speed) may reduce fuel burn at low power conditions by reducing an amount of fuel necessary to rotate the second rotatable component 120 at a desired low power condition. As such, the method 1000 may further include at 1009 decreasing a fuel flow at the combustion section (e.g., combustion section 26) such that rotating the second rotatable component at the second speed is based at least in part on the electrical energy generated from the first rotatable component. For example, operating the second rotatable component 120 as a hybrid power source such as previously described may provide a sufficient amount of electrical energy to rotate the second rotatable component 120 such that an amount of energy via the combustion gases 86 is reduced via reducing fuel flow, thereby improving fuel efficiency at low power conditions. Decreasing the fuel flow at the combustion section 26 and rotating the second rotatable component 120 via the electrical energy generated from the first rotatable component 110 and the combustion gases 86 may result in approximately no change in the second speed relative to rotating the second rotatable component 120 only via the combustion gases 86.

In another embodiment, rotating the second rotatable component at the second speed may include increasing a rotational speed of the second rotatable component based at least on the electrical energy from the first rotatable component. For example, electrical energy may be generated from the first rotatable component 110, such as from fan blades 42 of the fan assembly 14, due to wind milling. In one embodiment, wind milling may occur as an aircraft to which the engine 10 is coupled is at altitude and a force of air provides rotation of the first rotatable component 110. The electric machine 100 may derive electrical energy from the first rotatable component 110 due to wind milling and transmit electrical energy to the second rotatable component 120 to increase the rotational speed of the second rotatable component 120. For example, the increase in rotational speed of the second rotatable component 120 may be to increase a flow of air through the core engine 16 for altitude re-light (i.e., starting and igniting the engine 10 while at altitude). As such, the method 1000 may further include providing a flow of fuel to the combustion section and igniting the fuel and air mixture at altitude.

The method 1000 may further include at 1022 generating electrical energy via the second rotor assembly and the second rotatable component. For example, during operation of the engine 10, electrical energy is generated via a second load at the second rotor assembly 102 coupled to the HP spool as the second rotatable component 120. The second load may be increased to result in a resistance that decreases a second speed of the HP spool. As such, the method 1000 may further include at 1024 increasing the second load level at the second rotor assembly; and at 1026 decreasing the second speed of the second rotatable component via the increased second load generated from the second rotor assembly 102 and the second stator assembly 112.

In various embodiments, the method 1000 further includes at 1028 transmitting electrical energy from the second rotor assembly to the first rotor assembly; and at 1030 rotating the first rotatable component at the first speed based at least in part on the electrical energy from the first rotor assembly. For example, electrical energy generated from the second stator 112 and second rotor 102 may be transmitted to the first stator 111 and the first rotor 101 to promote or aide rotation of the LP spool as the first rotatable component 110.

In various embodiments, decreasing the second speed of the second rotatable component is further based on a compressor map 400. Referring briefly to FIG. 4, an exemplary embodiment of a compressor map as generally known in the art is generally provided. The compressor map 400 may generally provide at least a stall margin, a surge margin, an operating pressure ratio of the compressor, or an operating speed of the compressor. As such, the compressor map 400 may be utilized to determine a present or desired operating condition of the compressor, such as relative to one or more of a stall margin, a surge margin, an operating pressure ratio, or an operating speed. The compressor map 400 may further be utilized to determine an adjustment or control of a load applied or removed at the first and second rotatable components 110, 120 such as described in regard to FIGS. 1-3. Although the compressor map 400 is generally provided herein as a chart or graph, it should be appreciated that the data or information provided therein, such as described further below, may be defined as one or more of a database, a table, a function, a chart, a graph, etc., and may further be stored, utilized, manipulated, or updated within a controller (e.g., controller 210).

The compressor map 400 is generally defined by air flow rate at a compressor (e.g., the LP compressor 22, the HP compressor 24) of the compressor section 21 on a first axis 401 and a pressure ratio (e.g., pressure downstream at a compressor exit over pressure upstream at a compressor inlet) of the compressor at the compressor section 21, such as shown at the second axis 402. One or more speed lines 410 are defined. For example, the speed lines 410 may generally define a constant rotational or corrected speed of a rotor blade tip (e.g., mass flow rate of fluid corrected to ambient conditions at sea level on a standard day as generally known in the art). The compressor map 400 further defines a working or operating line 420. The operating line 420 generally defines points at which the engine 10 generally operates relative to the speed lines 410. The compressor map 400 further defines a surge line 415. The surge line 415 generally defines a region above which flow is unstable, such as to result in flow separation across the airfoils of the compressor and ultimately substantially complete disruption of flow through the compressor. Compressor surge is generally undesired in the operation of the compressor section 21, which may ultimately result in partial or complete failure of the engine 10.

The margin between the operating line 420 and the surge line 415 generally defines a surge margin of the compressor. Referring back to FIG. 3, the method 1000 may be utilized to reduce the surge margin such as to improve compressor performance while also enabling safe operation of the compressor section 21 and engine 10. For example, the method 1000 at 1010, and in various embodiments, further at 1014, may be utilized to control or adjust the rotational second speed of the second rotatable component 120 such as to mitigate compressor stall or compressor surge. In one embodiment, the method 1000 may be utilized to reduce the rotational second speed of the second rotatable component 120, such as by increasing a second load at the second rotatable component 120 via the second stator assembly 112 and the second rotor assembly 102. Reduction in the rotational speed of the second rotatable component 120 may enable the compressor to operate further from the surge line 415 (FIG. 4) as necessary.

In another embodiment, the method 1000 may be utilized to increase the rotational second speed of the second rotatable component 120, such as by decreasing a second load at the second rotatable component 120 via the second stator assembly 112 and the second rotor assembly 102. In one embodiment, the increase in the rotational second speed may further include a changing a flow of fuel to the combustion section 26, such as decreasing or increasing the flow of fuel such as previously described above.

Referring back to FIG. 3, embodiments of the electric machine 100 generally provided and described herein may further include one or more of a bearing assembly, a lubricant fluid system for the bearing assembly, a starter motor, an alternator/generator, a thermal management system (e.g., fuel, oil, hydraulic fluid, and/or air heat exchanger), or combinations thereof. For example, the electric machine 100 may further include one or more pumps, sumps, dampers, supply conduits, scavenge conduits, buffer fluid conduits, etc. for a lubricant fluid system in addition to the stator assembly 115. The electric machine 100 may further include a speed reduction device, such as a transmission or gear assembly, a pneumatic or hydraulic speed reduction assembly, etc. that may reduce the rotational speed from the LP shaft 36 to the fan rotor 38. In still various embodiments, the electric machine 100 may further include a speed reduction device that may reduce the rotational speed from the HP spool, such as the second rotatable component 120, to the second rotor assembly 112, such as to define a more useful or efficient operating speed of the second rotor assembly 112 relative to the second stator assembly 102.

Referring back to FIG. 1, the engine 10 may also include a controller 210. In general, the controller 210 can correspond to any suitable processor-based device, including one or more computing devices. For instance, FIG. 1 illustrates one embodiment of suitable components that can be included within the controller 210.

As shown in FIG. 1, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations such as those outlined in the method 1000 and embodiments thereof. As such, the instructions may include one or more steps of the method 1000. Still further, the operations may include executing one or more steps of the method 1000. In addition, the control logic 216 can include an embodiment of the compressor map 400 (FIG. 4). In various embodiments, the compressor map 400 may define a table, curve, or function that may be referenced when executing one or more steps of the method 1000.

Additionally, as shown in FIG. 1, the controller 210 may also include a communications interface module 230. In various embodiments, the communications interface module 230 can include associated electronic circuitry that is used to send and receive data. As such, the communications interface module 230 of the controller 210 can be used to receive data from the electric machine 100, the first rotatable component 110, and the second rotatable component 120. In addition, the communications interface module 230 can also be used to communicate with any other suitable components of the engine 10, including any number of sensors configured to monitor one or more operating parameters of the engine 10, such as, but not limited to, the first speed of the first rotatable component 110, the second speed of the second rotatable component 120, a flow of fuel (or a pressure, volume, area, or other geometry, or density of fuel, etc. utilized to calculate the flow of fuel) to the combustion section 26, a pressure, temperature, density, etc. of the air 80, 82 around the engine 10 and therethrough. It should be appreciated that the communications interface module 230 can be any combination of suitable wired and/or wireless communications interfaces and, thus, can be communicatively coupled to one or more components of the engine 10 via a wired and/or wireless connection.

The embodiments of the structure and method 1000 for operating a turbomachine 10 including an electric machine 100 generally provided herein may improve overall engine performance and operability by embedding the electric machine 100 at multiple spools (e.g., the LP spool and the HP spool) of the engine 10 and transmitting energy to and from each spool based on engine operation. At conditions off of an aero design point or equivalent, such as off-design conditions (e.g., startup, ignition, sub-idle, idle, mid-power, altitude re-light, etc.), energy may be traded and transmitted between the LP spool and the HP spool to reduce fuel burn, improve engine efficiency, improve engine performance, and maintain or improve engine operability margins.

Still further, the various embodiments of the structure and method 1000 generally provided herein may be utilized to adjust from which rotatable component an aircraft or other apparatus extracts electric energy. For example, the method 1000 may be utilized to substantially or completely extract electrical energy from the first rotatable component 110 via increasing the first load and decreasing a second load such that minimal to no electrical energy is extracted via the second rotatable component 120. As another example, the method 1000 may be utilized to substantially or completely extract electrical energy from the second rotatable component 120 via increasing the second load and decreasing a first load such that minimal to no electrical energy is extracted via the first rotatable component 110.

As yet another example, an aircraft or other apparatus may extract electrical energy from both the first rotatable component 110 and the second rotatable component 120. In various embodiments, the method 1000 may be utilized to extract up to approximately 95% of electrical energy from the first rotatable component 110 and up to approximately 5% of electrical energy from the second rotatable component 120. In other embodiments, the method 1000 may be utilized to extract up to approximately 95% of electrical energy from the second rotatable component 120 and up to approximately 5% of electrical energy from the first rotatable component 110.

In various embodiments, a proportion of the electrical energy extracted from the first rotatable component 110 and the second rotatable component 120 may be based at least on an engine operating condition, or changes thereof. For example, during a relatively low power engine operating condition, the aircraft or other apparatus may substantially or completely extract electrical energy from the first rotatable component 110. As another example, during a relatively medium or high power engine operating condition, the aircraft or other apparatus may substantially or completely extract electrical energy from the second rotatable component 120. Still further, the structures and methods 1000 generally provided herein may enable selective control or switching of electrical energy extraction between the first rotatable component 110 and the second rotatable component 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a turbomachine, the method comprising:
    rotating a first rotatable component at a first speed, wherein the first rotatable component comprises a first compressor, and wherein the first rotatable component is operably coupled to a first electric machine having a first rotor assembly and a first stator assembly, the first stator assembly constituting a portion of a fixed stator assembly;
    rotating a second rotatable component at a second speed, wherein the second rotatable component comprises a second compressor, and wherein the second rotatable component is operably coupled to a second electric machine having a second rotor assembly and a second stator assembly, the second stator assembly constituting another portion of the fixed stator assembly, the fixed stator assembly disposed between the first rotatable rotor assembly and the second rotatable rotor assembly; and
    transferring energy generated from at least one of the first electric machine or the second electric machine to adjust the first speed or the second speed based on a compressor map determinative of a desired operating condition relative to one or more of a stall margin, a surge margin, an operating pressure ratio, or an operating speed.

2. The method of claim 1, wherein the first rotatable component is a low pressure spool of the turbomachine, and wherein the second rotatable component is a high pressure spool of the turbomachine.

3. The method of claim 2, the method comprising:
    adjusting a first load at the first electric machine to adjust the first speed based on the compressor map relative to the first compressor.

4. The method of claim 3, wherein adjusting the first load based on the compressor map comprises decreasing the first speed at the first rotatable component by increasing the first load at the first rotatable component.

5. The method of claim 4, the method comprising:
    transmitting energy generated from the first electric machine to the second electric machine, wherein rotating the second rotatable component at the second speed is based at least in part on energy from the second electric machine.

6. The method of claim 2, the method comprising:
    adjusting a second load at the second electric machine to adjust the second speed based on the compressor map relative to the second compressor.

7. The method of claim 6, wherein adjusting the second speed based on the compressor map comprises decreasing the second speed at the second rotatable component by increasing the second load at the second rotatable component.

8. The method of claim 7, the method comprising:
    transmitting energy generated from the second electric machine to the first electric machine, wherein rotating the first rotatable component at the first speed is based at least in part on energy from the first electric machine.

9. The method of claim 1, wherein rotating the second rotatable component at the second speed is based on combustion gases generated at a combustion section and a first load generated at the first electric machine.

10. The method of claim 9, the method comprising:
    decreasing a fuel flow at the combustion section; and
    rotating the second rotatable component via the combustion gases and energy transferred from the first rotatable component.

11. The method of claim 10, the method comprising:
    maintaining the second speed at the second rotatable component at approximately no change while decreasing fuel flow at the combustion section and rotating the second rotatable component via the combustion gases and energy transferred from the first rotatable component.

12. The method of claim 1, the method comprising:
    increasing the second speed based at least in part on energy generated from the first electric machine.

13. A turbomachine, the turbomachine comprising:
    a first rotatable component forming a low pressure spool comprising a first compressor, wherein the first rotatable component is rotatable to a first speed;
    a second rotatable component forming a high pressure spool comprising a second compressor, wherein the second rotatable component is rotatable to a second speed;
    a first electric machine operably coupled to the first rotatable component, the first electric machine having a first rotor assembly and a first stator assembly, the first stator assembly constituting a portion of a fixed stator assembly;

a second electric machine operably coupled to the second rotatable component, the second electric machine having a second rotor assembly and a second stator assembly, the second stator assembly constituting another portion of the fixed stator assembly; and a controller configured to store instructions that perform operations when executed, the operations comprising:

rotating the first rotatable component at the first speed;

rotating the second rotatable component at the second speed; and transferring energy generated from at least one of the first electric machine or the second electric machine to adjust the first speed or the second speed based on a compressor map determinative of a desired operating condition relative to one or more of a stall margin, a surge margin, an operating pressure ratio, or an operating speed.

14. The turbomachine of claim 13, the operations comprising:

adjusting a second load at the second electric machine to adjust the second speed based on the compressor map relative to the second compressor, wherein adjusting the second speed based on the compressor map comprises decreasing the second speed at the second rotatable component by increasing the second load at the second rotatable component.

15. The turbomachine of claim 14, the operations comprising:

transmitting energy generated from the second electric machine to the first electric machine, wherein rotating the first rotatable component at the first speed is based at least in part on energy from the first electric machine.

16. The turbomachine of claim 13, the turbomachine comprising:

a combustion section configured to generate combustion gases, wherein rotating the second rotatable component at the second speed is based on combustion gases generated at the combustion section and a first load generated at the first electric machine.

17. The turbomachine of claim 16, the operations comprising:

maintaining the second speed at the second rotatable component at approximately no change while decreasing a fuel flow at the combustion section and rotating the second rotatable component via the combustion gases and energy transferred from the first rotatable component.

18. The turbomachine of claim 13, the operations comprising:

increasing the second speed based at least in part on energy generated from the first electric machine.

19. The turbomachine of claim 13, the operations comprising:

adjusting a first load at the first electric machine to adjust the first speed based on the compressor map relative to the first compressor, wherein adjusting the second first based on the compressor map comprises decreasing the first speed at the first rotatable component by increasing the first load at the first rotatable component.

20. The turbomachine of claim 19, the operations comprising:

transmitting energy generated from the first electric machine to the second electric machine, wherein rotating the second rotatable component at the second speed is based at least in part on energy from the second electric machine.

21. A method for operating a turbomachine, the method comprising:

adjusting a first load at a first rotor assembly of a first electric machine electrically coupled to a first rotatable component comprising at least a portion of a first compressor, a first turbine, or a first shaft, wherein the first electric machine is electrically coupled to the first rotatable component such that a first speed of the first rotatable component is increased or decreased based on an engine condition and the first load, the first electric machine having a first stator assembly constituting a portion of a fixed stator assembly;

adjusting a second load at a second rotor assembly of a second electric machine electrically coupled to a second rotatable component comprising at least a portion of a second compressor, a second turbine, or a second shaft, and wherein the second electric machine is electrically coupled to the second rotatable component such that a second speed of the second rotatable component is decreased or increased based on the engine condition and the second load, the second electric machine having a second stator assembly constituting another portion of the fixed stator assembly, the fixed stator assembly disposed between the first rotor assembly and the second rotor assembly;

transferring electrical energy generated from at least one of the first rotatable component or the second rotatable component;

rotating the second rotatable component at the second speed defining a minimum steady state second speed; and increasing the first load level at the first rotor assembly to i) decrease the first speed of the first rotatable component via the increased first load level, or ii) generate electrical energy via the first rotor assembly and the first rotatable component and changing a fuel flow at a combustion section of the turbomachine.

* * * * *